United States Patent
Jackson et al.

(10) Patent No.: US 8,139,563 B2
(45) Date of Patent: Mar. 20, 2012

(54) SYSTEM FOR ALTERNATE COMMUNICATIONS IN AN INTERNET PROTOCOL MULTIMEDIA SUBSYSTEM NETWORK

(75) Inventors: James Jackson, Austin, TX (US); Mehrad Yasrebi, Austin, TX (US)

(73) Assignee: AT&T Knowledge Ventures, L.P., Reno, NV (US)

( * ) Notice: Subject to any disclaimer, the term of this patent is extended or adjusted under 35 U.S.C. 154(b) by 1155 days.

(21) Appl. No.: 11/866,876

(22) Filed: Oct. 3, 2007

(65) Prior Publication Data

US 2009/0093250 A1    Apr. 9, 2009

(51) Int. Cl.
*H04L 12/66* (2006.01)
(52) U.S. Cl. .................. 370/352; 370/389; 379/88.17
(58) Field of Classification Search .................. None
See application file for complete search history.

(56) References Cited

U.S. PATENT DOCUMENTS

| | | | |
|---|---|---|---|
| 7,508,819 B2* | 3/2009 | Kobayashi et al. | 370/352 |
| 2005/0207402 A1* | 9/2005 | Kobayashi et al. | 370/352 |
| 2006/0020713 A1* | 1/2006 | Kobayashi et al. | 709/245 |
| 2007/0104184 A1* | 5/2007 | Ku et al. | 370/352 |
| 2007/0165613 A1* | 7/2007 | Soo et al. | 370/356 |
| 2007/0286379 A1* | 12/2007 | Wiatrowski et al. | 379/201.01 |
| 2008/0025492 A1* | 1/2008 | Heinze et al. | 379/220.01 |
| 2008/0080488 A1* | 4/2008 | Marsico | 370/352 |
| 2008/0130856 A1* | 6/2008 | Ku et al. | 379/201.01 |
| 2008/0247526 A1* | 10/2008 | Qiu et al. | 379/142.06 |
| 2008/0281975 A1* | 11/2008 | Qiu et al. | 709/230 |
| 2008/0317000 A1* | 12/2008 | Jackson | 370/352 |
| 2009/0003380 A1* | 1/2009 | Jackson | 370/466 |
| 2009/0034698 A1* | 2/2009 | Karnalkar et al. | 379/88.22 |
| 2009/0059894 A1* | 3/2009 | Jackson et al. | 370/352 |
| 2009/0059895 A1* | 3/2009 | Yasrebi et al. | 370/352 |

FOREIGN PATENT DOCUMENTS

WO    2007067464    6/2007

* cited by examiner

*Primary Examiner* — Bob Phunkulh
(74) *Attorney, Agent, or Firm* — Hanley, Flight & Zimmerman, LLC (57) ABSTRACT

A system that incorporates teachings of the present disclosure may include, for example, a Unified Messaging System (UMS) having a Session Border Controller (SBC) to receive a Session Initiation Protocol Uniform Resource Identifier (SIP URI), detect from a host portion of the SIP URI that the SIP URI is associated with a failover communication session, update a user portion of the SIP URI to indicate a failure disposition, and route the updated SIP URI to a call agent of the UMS. Additional embodiments are disclosed.

23 Claims, 4 Drawing Sheets

SYSTEM FOR ALTERNATE COMMUNICATIONS IN AN INTERNET PROTOCOL MULTIMEDIA SUBSYSTEM NETWORK

FIELD OF THE DISCLOSURE

The present disclosure relates generally to an Internet Protocol Multimedia Subsystem (IMS) network and more specifically to a system for alternate communications in an IMS network.

BACKGROUND

Typically when a calling party places a call in an IMS network, an E.164 number associated with a targeted terminal device is translated into a Session Initiation Protocol Uniform Resource Identifier (SIP URI) by a Telephone Number Mapping (ENUM) system. The call is then initiated by a Serving Call Session Control Function (S-CSCF) using the SIP URI.

In instances where the targeted terminal device is a Unified Messaging System (UMS), there may be situations where the terminal is non-responsive due to a failure in operations of said system. Service providers can consider adding a backup UMS which mirror images a primary UMS to mitigate failures. Such implementations, however, can be expensive and complex.

DETAILED DESCRIPTION

In one embodiment of the present disclosure, a computer-readable storage medium operating in a Serving Call Session Control Function (S-CSCF) can have computer instructions for transmitting a query to a Telephone Number Mapping (ENUM) system for a called party number, receiving from the ENUM system a primary Session Initiation Protocol Uniform Resource Identifier (SIP URI) and a backup SIP URI, initiating a first communication session according to the primary SIP URI, detecting a failure to establish communications with the primary SIP URI, and initiating communications according to the backup SIP URI.

In one embodiment of the present disclosure, a Unified Messaging System (UMS) can have a Session Border Controller (SBC) to receive a SIP URI, detect from a host portion of the SIP URI that the SIP URI is associated with a failover communication session, update a user portion of the SIP URI to indicate a failure disposition, and route the updated SIP URI to a call agent of the UMS.

In one embodiment of the present disclosure, an Telephone Number Mapping (ENUM) system can have a controller adapted to transmit primary and backup SIP URIs responsive to receiving an ENUM query.

Figure 1:
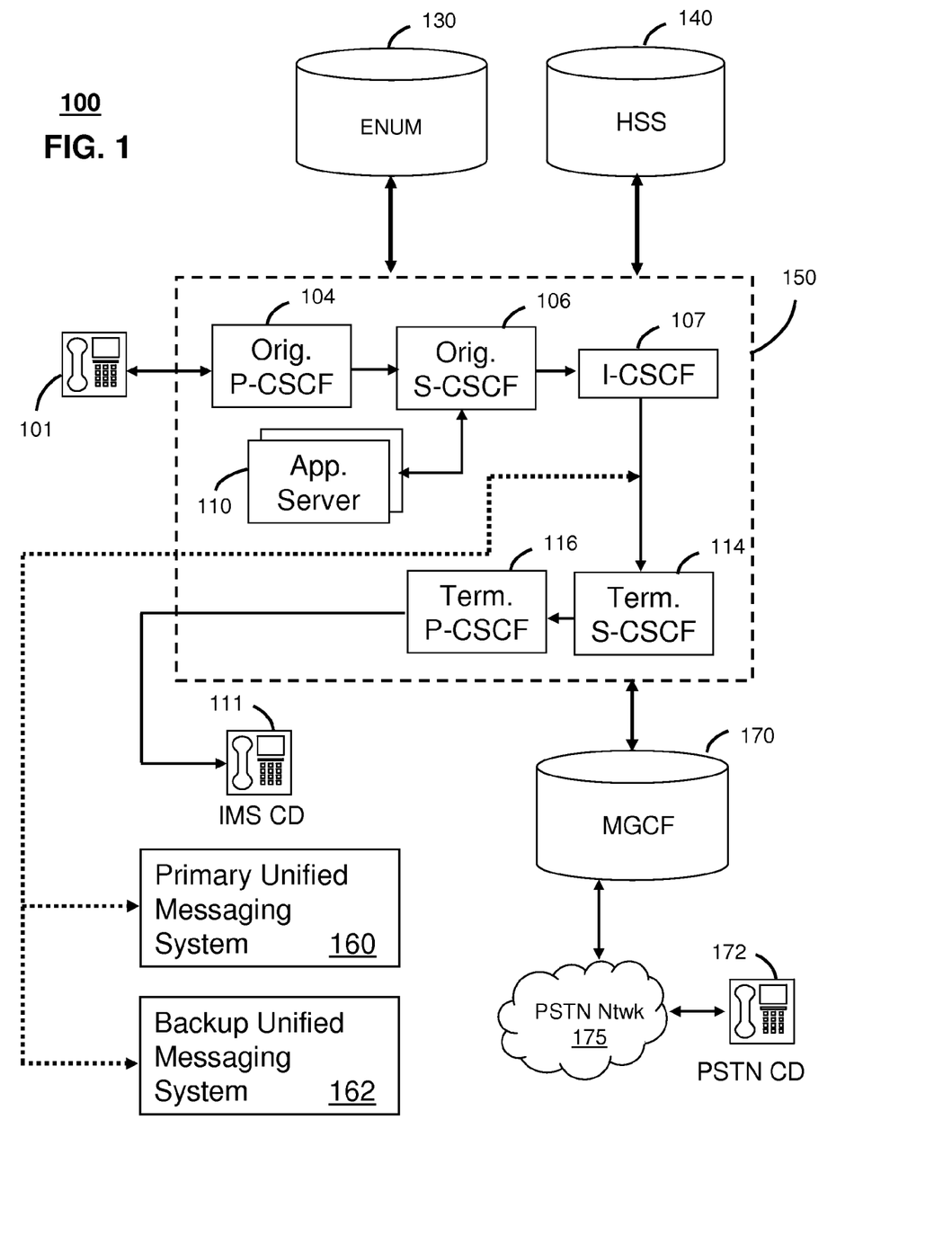
FIG. 1 depicts an exemplary embodiment of a communication system.

FIG. 1 depicts an exemplary communication system 100. The communication 100 can comprise a Home Subscriber Server (HSS) 140, a tElephone NUmber Mapping (ENUM) server 130, and common network elements of an IMS network 150. The IMS network 150 can be coupled to IMS communication devices such as an IMS-compliant phones 101, 111, and primary and backup IMS-compliant Unified Messaging Systems (UMSs) 160, 162 that provide unified messaging services such as voicemail, email, fax, and so on. Public Switched Telephone Network (PSTN) devices such as a PSTN phone 172 can be accessed by the IMS network 150 by way of a Media Gateway Control Function (MGCF) 170 coupled to a PSTN network 175.

To establish a communication session between phones, the IMS network 150 can utilize an originating Serving Call Session Control Function (S-CSCF) 106. The originating S-CSCF 106 can submit queries to the ENUM server 130 to translate an E.164 telephone number to a SIP Uniform Resource Identifier (URI) if the targeted communication device is IMS compliant. If the targeted communication device is a PSTN device such as reference 172, the ENUM server 130 will respond with an unsuccessful address resolution and the originating S-CSCF 106 will forward the call to the MGCF 170 which connects the call through the PSTN network 175 using common signaling means such as SS7.

In the case where the ENUM server 130 returns a SIP URI, the SIP URI is used by an Interrogating CSCF (I-CSCF) 107 to submit a query to the HSS 140 to identify a terminating S-CSCF 114 associated with a targeted IMS communication device such as IMS CD 111. Once identified, the I-CSCF 107 can submit the SIP INVITE message to the terminating S-CSCF 114 which then identifies a terminating P-CSCF 116 associated with the targeted communication device. The P-CSCF 116 can then signal the communication device to establish communications. When the targeted IMS communication device is the primary UMS 160, the ENUM system 130 can be programmed to supply a SIP URI for the primary UMS and a SIP URI for the backup UMS 162. Method 200 of FIG. 2 addresses how these SIP URIs can be utilized which will be discussed shortly.

In addition to the aforementioned network elements of the IMS network 150, there can be a number of application servers 110 which can provide a variety of services to IMS subscribers. For example, the application server 110 can be used to perform originating treatment functions on the calling party number received by the S-CSCF 106. Originating treatment functions can include determining whether the calling party number has international calling services, and/or is requesting special telephony features (e.g., *72 forward calls, *73 cancel call forwarding, etc.).

Figure 2:
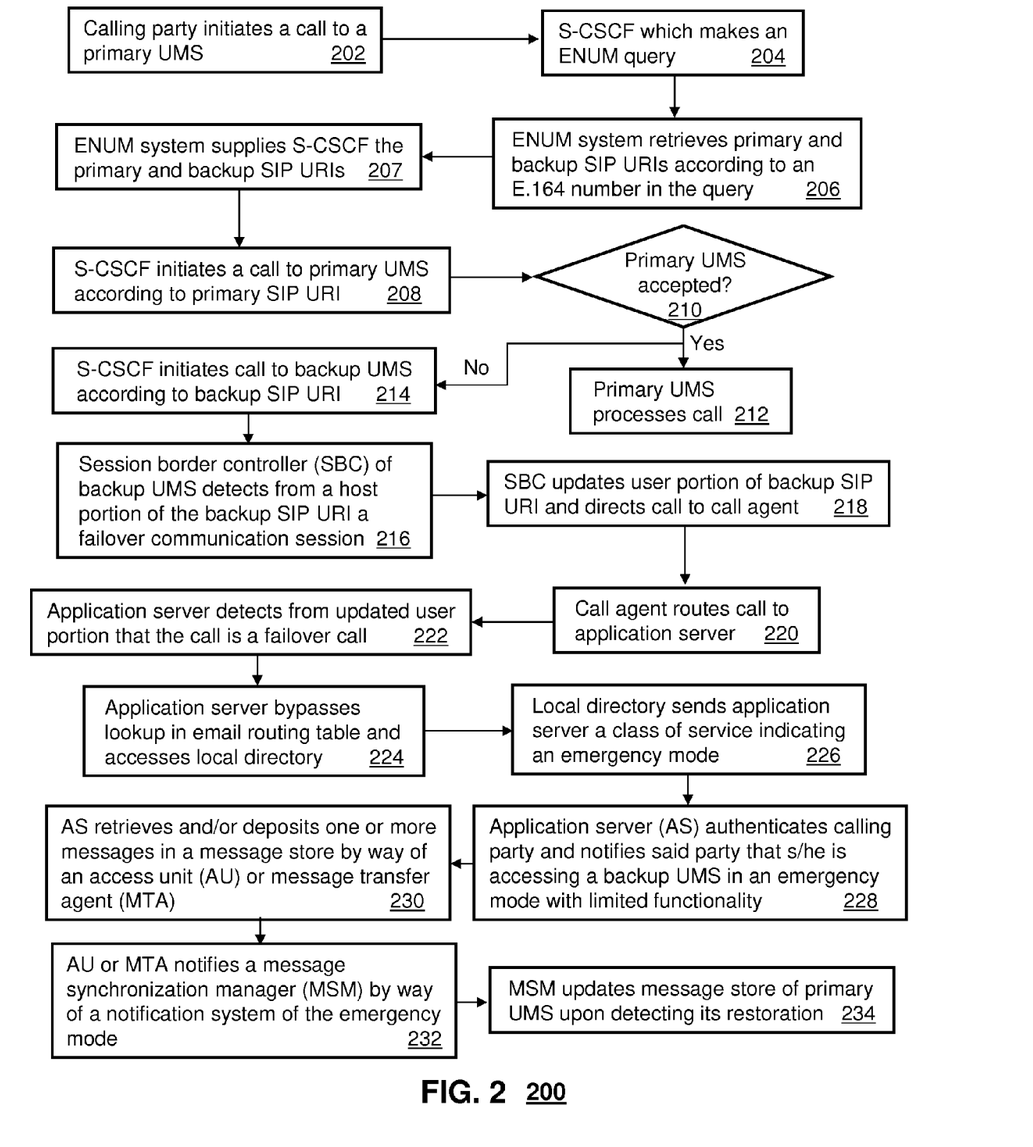
FIG. 2 depicts exemplary method operating in portions of the communication system.
Figure 3:
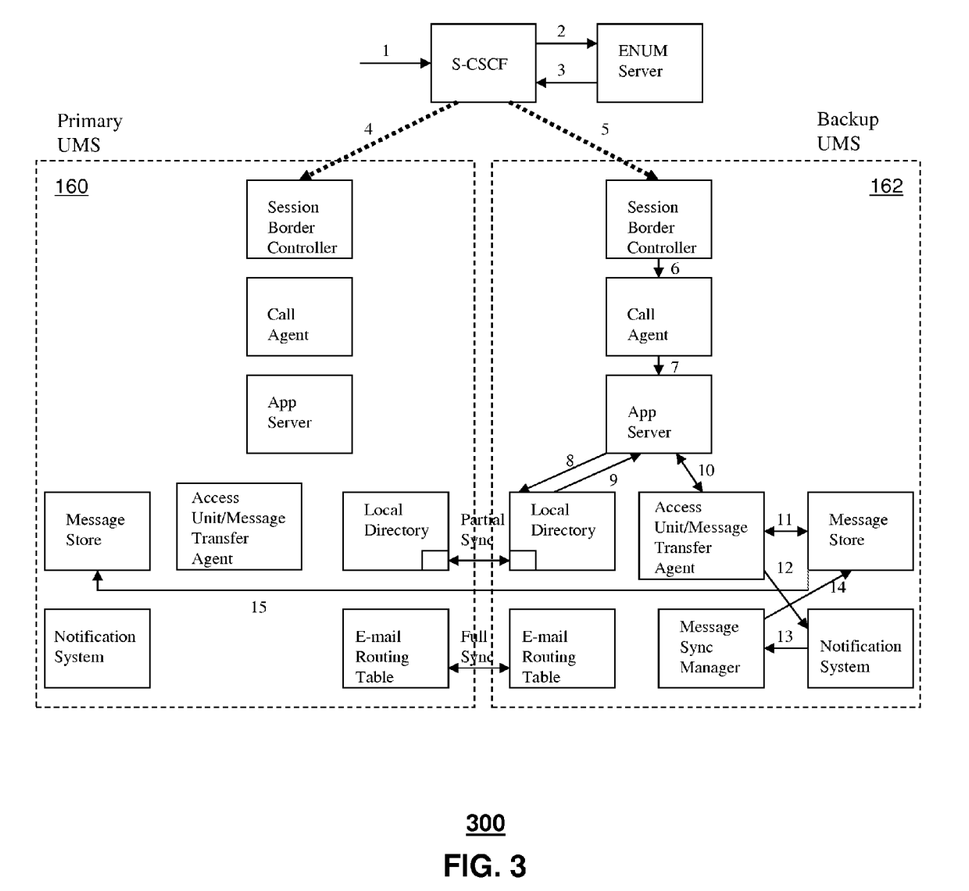
FIG. 3 depicts an exemplary block diagram of primary and backup unified messaging systems of the communication system.

FIG. 2 depicts an exemplary method 200 operating in portions of the communication system 100. FIG. 3 depicts an exemplary block diagram of the primary and backup UMSs 160, 162 which supplements the description of method 200. Method 200 begins with step 202 in which a calling party initiates a call with a PSTN or IMS compliant device directed to the primary UMS 160. This step can represent a subscriber desiring to retrieve or respond to voicemail, fax messages or emails. In step 204, an originating S-CSCF 106 assigned to the communication device of the calling party makes an ENUM query according to an E.164 number of the primary UMS 160 supplied in the call. The ENUM system 130 retrieves in step 206 primary and backup SIP URIs according to the E.164 number and supplies them to the originating S-CSCF 106 in step 207.

The primary and backup SIP URIs can be supplied to the ENUM system 130 by the HSS 140 when each of the primary and backup UMSs 160, 162 are registered in the IMS network 150. The primary and backup SIP URIs can also be supplied to the ENUM system 130 by other suitable sources that are aware of the SIP URIs of each of the primary and backup UMSs 160, 162. The primary and secondary SIP URIs can be distinguished from each other by their host name. For example, a primary SIP URI might look like 5121110000@site1.um.xxx.com while the backup SIP URI might look like 5121110000@backupsite1.um.xxx.com.

In step 208, the S-CSCF 106 initiates a call to the primary UMS 160 according to the primary SIP URI. If the S-CSCF 106 detects in step 210 that the primary UMS 160 has accepted the call by way of its session border controller, then the call can be processed by the primary UMS 160 in step 212 by common means. For example in step 212 the calling party can be asked to authenticate him or herself, and responsive to a successful authentication can be given access to voicemail, email and fax messages associated with the calling party's account.

If on the other hand the primary UMS 160 does not respond or accept the call in step 210, the S-CSCF 106 can resort to initiating a call in step 214 to the backup UMS 162 according to the backup SIP URI. In step 216 a session border controller (SBC) of the backup UMS 162 can detect from a host portion of the backup SIP URI (e.g., backupsite1.um.xxx.com) that the call is associated with a failover communication session with the primary UMS 160. Responsive to said detection, the SBC can update in step 218 a user portion (e.g., 5121110000) of the backup SIP URI by for example inserting a prefix (e.g., 9995121110000) and transferring the updated SIP URI to a call agent for further processing. Typically a call agent changes the host portion of the SIP URI when transferring a call to an application server. The prefix inserted in the user portion of the backup SIP URI can be used by the application server to maintain the identity status of the call as a failover communication session irrespective of what the call agent does to the host portion of the backup SIP URI.

Accordingly in step 220 the call agent routes the call to the application server with the inserted prefix in the user portion. The application server in step 222 can detect from the updated user portion that the call is a failover call independent of whether the call agent changed the host portion of the backup SIP URI. Responsive to detecting the "999" prefix, the application server in step 224 can be programmed to bypass a normal operation of performing a lookup step in the email routing table to determine whether the call should be directed to a mailbox in another site and either fail or redirect the call. Instead the application server accesses its local directory which is partially synchronized with the local directory of the primary UMS 160. The local directory can store subscriber information such as for example the subscriber's class of service (e.g., only subscribed to voicemail, no email or fax service), authentication information (e.g., login personal identification number or PIN), and so on.

In step 226 the local directory returns a class of service based on the "999" prefix that indicates the call is to be processed in an emergency mode. In step 228, the application server can authenticate the calling party when said party makes a request to retrieve messages. In this step the application server can also notify the calling party that s/he is accessing the backup UMS 162 in an emergency mode with limited functionality. Limited functionality in the present context can mean that the backup UMS 162 is programmed to process only new messages arising after the primary UMS 160 is out of service and may not provide common features such as auto-forwarding services to respond to voicemail and/or email. Consequently, the backup UMS 162 will not have a mirror-image copy of messages stored in the primary UMS 160. This limited mode of operation helps to reduce cost and complexity for backup UMS services.

In step 230, the application server of the backup UMS 162 can retrieve and/or deposit one or more messages in its message store by way of an access unit (for message retrievals using for example an IMAP protocol) and message transfer agent (for message deposits using for example an SMTP protocol). During a first access of the message store of the backup UMS 162 the access unit or the message transfer agent of said system can create a mailbox structure on-the-fly for the subscriber. This ensures that only mailboxes that are in use during the failover will be created on the backup UMS 162. There would therefore be no need to pre-load mailbox structures for all subscribers.

As just noted, these messages would arise after the backup UMS 162 has detected the failover of the primary UMS 160. When retrieving or depositing messages, the access unit or the message transfer agent notifies in step 232 a message synchronization manager of the emergency mode condition by way of a notification system. Responsive to said notification, the message synchronization manager monitors in step 234 the primary UMS 160 for restoration of service.

In this step the message synchronization manager can poll the primary UMS 160 to detect a restoration of service, or it can wait for the primary UMS to send a message that indicates it is operational. When it detects that service has been restored, the message synchronization manager updates the message store of the primary UMS 160 with messages accumulated by the backup UMS 162 during the service outage. When the backup UMS 162 detects in step 234 a restoration of services for the primary UMS 160 the backup UMS can purge its memory banks.

It should be noted that the backup UMS 162 can represent a fully function UMS system which performs the services of the primary UMS 160 for other subscribers. The backup UMS 162 can accomplish this by reserving some of its resources for failover services of one or more other UMS systems. The principles of method 200 can therefore be applied to the primary UMS 160. Accordingly a network of UMS systems can be configured to provide backup services to each other.

FIG. 3 summarizes steps 202-234 of method 200 according to references 1-15.

Upon reviewing the embodiments disclosed, it would be evident to an artisan with ordinary skill in the art that said embodiments can be modified, reduced, or enhanced without departing from the scope and spirit of the claims described below. For example, step 234 can be replaced with a step in which the primary UMS 160 accesses the message store of the backup UMS 162 by way of a network file system mount. In this embodiment, there would be no need to transfer messages between UMS systems after failover recovery. In yet another embodiment, method 200 can be adapted to provide one or more backup SIP URIs for any targeted communication device, not just a UMS. In this embodiment, when a calling party targets a called party and there is no response, the originating S-CSCF 106 can be programmed to redirect the call to a backup SIP URI which may represent an alternative communication device of the called party (e.g., fixed or mobile phone). In yet another embodiment, method 200 can be adapted to insert multiple prefixes and/or headers to indicate or describe a failure disposition.

Other suitable modifications can be applied to the present disclosure without departing from the scope of the claims below. Accordingly, the reader is directed to the claims for a fuller understanding of the breadth and scope of the present disclosure.

Figure 4:
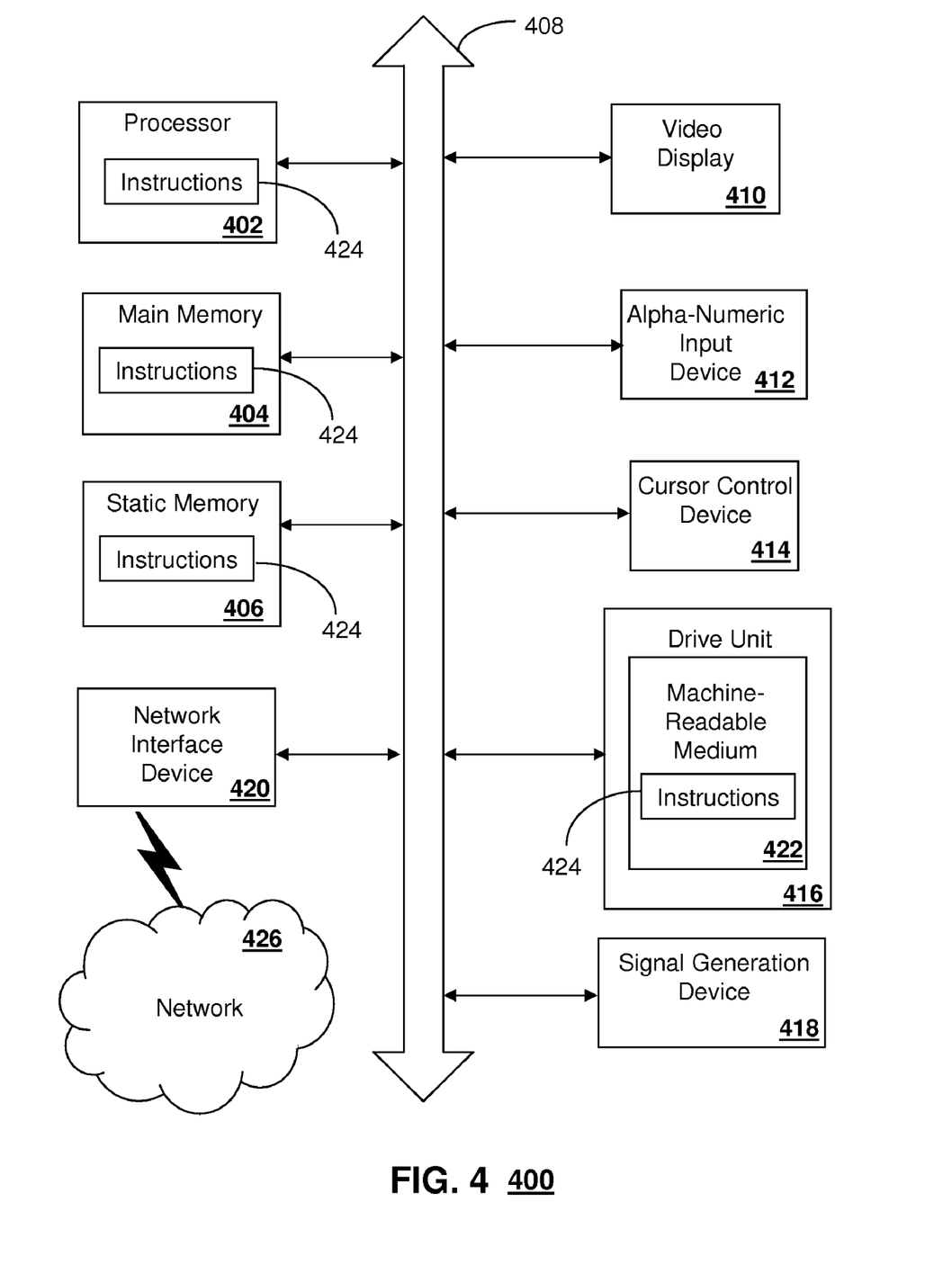
FIG. 4 depicts an exemplary diagrammatic representation of a machine in the form of a computer system within which a set of instructions, when executed, may cause the machine to perform any plurality of the methodologies disclosed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or any other tangible successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A tangible machine-readable storage medium comprising instructions which, when executed, cause a machine to at least:
   transmit a query to a Telephone Number Mapping system for a called party number;
   receive from the Telephone Number Mapping system: a primary Session Initiation Protocol Uniform Resource Identifier corresponding to a primary Unified Messaging System and a backup Session Initiation Protocol Uniform Resource Identifier corresponding to a backup Unified Messaging System;
   initiate a first communication session according to the primary Session Initiation Protocol Uniform Resource Identifier;
   detect a failure to establish communications with the primary Session Initiation Protocol Uniform Resource Identifier; and
   initiate communications according to the backup Session Initiation Protocol Uniform Resource Identifier.

2. The storage medium of claim 1, wherein the called party number comprises an E.164 number conforming to an international public telecommunications number plan.

3. The storage medium of claim 1, wherein the primary Session Initiation Protocol Uniform Resource Identifier is associated with a first communication device associated with the called party number.

4. The storage medium of claim 3, wherein the second Session Initiation Protocol Uniform Resource Identifier is associated with a second communication device associated with the called party number.

5. The storage medium of claim 1, wherein each of the primary and backup Unified Messaging Systems support at least one among a plurality of communication services comprising voicemail, email, and fax.

6. The machine readable storage medium of claim 1, wherein the instructions are to cause the machine to transmit the query from a Serving Call Session Control Function server.

7. A Unified Messaging System, comprising a Session Border Controller to at least:
   receive a Session Initiation Protocol Uniform Resource Identifier;
   detect from a host portion of the Session Initiation Protocol Uniform Resource Identifier that the Session Initiation Protocol Uniform Resource Identifier is associated with a failover communication session;
   update a user portion of the Session Initiation Protocol Uniform Resource Identifier to indicate a failure disposition; and
   route the updated Session Initiation Protocol Uniform Resource Identifier to a call agent of the Unified Messaging System.

8. The Unified Messaging System of claim 7, wherein the Session Border Controller is adapted to receive the Session Initiation Protocol Uniform Resource Identifier from a Serving Call Session Control Function, and wherein the Unified Messaging System operates according to an internet protocol multimedia subsystem network.

9. The Unified Messaging System of claim 7, wherein the Session Border Controller is to insert a prefix into the user portion of the Session Initiation Protocol Uniform Resource Identifier to indicate the failure disposition.

10. The Unified Messaging System of claim 9, further comprising the call agent to route a call associated with the updated Session Initiation Protocol Uniform Resource Identifier to an application server.

11. The Unified Messaging System of claim 10, further comprising the application server to access a local directory responsive to detecting a failure disposition from the prefix.

12. The Unified Messaging System of claim 11, wherein the application server is to authenticate a calling party that initiated the call.

13. The Unified Messaging System of claim 12, wherein the application server is to:
   receive a class of service indicator from the local directory; and
   retrieve or deposit one or more messages in a message store by way of an access unit or message transfer agent.

14. The Unified Messaging System of claim 13, wherein the application server is to notify the calling party that the Unified Messaging System is operating in an emergency mode with limited functionality.

15. The Unified Messaging System of claim 14, comprising the access unit and the message transfer agent, wherein at least one of the access unit and the message transfer agent is to notify a message synchronization manager of the emergency mode.

16. The Unified Messaging System of claim 15, wherein at least one of the access unit and the message transfer agent is to create a mailbox structure in a message store according to the class of service.

17. The Unified Messaging System of claim 13, comprising a message synchronization manager which is to transmit the one or more messages in the message store to a second message store of a corresponding second Unified Messaging System responsive to detecting that the second Unified Messaging System has been restored to service.

18. A Telephone Number Mapping system, comprising a controller to transmit primary and backup Session Initiation Protocol Uniform Resource Identifiers in response to receiving a Telephone Number Mapping query, the primary Session Initiation Protocol Uniform Resource Identifier corresponding to a primary Unified Messaging System, the backup Session Initiation Protocol Uniform Resource Identifier corresponding to a backup Unified Messaging System, the primary Unified Messaging System is to be called according to the primary Session Initiation Protocol Uniform Resource Identifier before the backup Unified Messaging System may be called according to the backup Session Initiation Protocol Uniform Resource Identifier.

19. The Telephone Number Mapping system of claim 18, wherein the controller is to receive the Telephone Number Mapping query from a Serving Call Session Control Function.

20. The Telephone Number Mapping system of claim 18, wherein the primary Session Initiation Protocol Uniform Resource Identifier is associated with a first communication device, and the backup Session Initiation Protocol Uniform Resource Identifier is associated with a second communication device.

21. The Telephone Number Mapping system of claim 20, wherein the Serving Call Session Control Function is to communicate with the second communication device according to the backup Session Initiation Protocol Uniform Resource Identifier when the first communication device is non-responsive to a communication session initiated by the Serving Call Session Control Function with the primary Session Initiation Protocol Uniform Resource Identifier.

22. The Telephone Number Mapping system of claim 18, wherein the controller is to receive and record the primary and backup Session Initiation Protocol Uniform Resource Identifiers from a provisioning service.

23. The Telephone Number Mapping system of claim 22, wherein the provisioning service comprises a Home Subscriber Server.

\* \* \* \* \*

UNITED STATES PATENT AND TRADEMARK OFFICE
CERTIFICATE OF CORRECTION

| | | |
|---|---|---|
| PATENT NO. | : 8,139,563 B2 | Page 1 of 1 |
| APPLICATION NO. | : 11/866876 | |
| DATED | : March 20, 2012 | |
| INVENTOR(S) | : Jackson et al. | |

It is certified that error appears in the above-identified patent and that said Letters Patent is hereby corrected as shown below:

ON THE TITLE PAGE:

Item (73) Assignee:

Change Assignee Name and Residence Data from: "AT&T Knowledge Ventures, L.P. Reno, Nevada"; to "AT&T Intellectual Property, I, L.P.   Atlanta, Georgia".

Signed and Sealed this
Eighth Day of May, 2012

David J. Kappos
*Director of the United States Patent and Trademark Office*